UNITED STATES PATENT OFFICE.

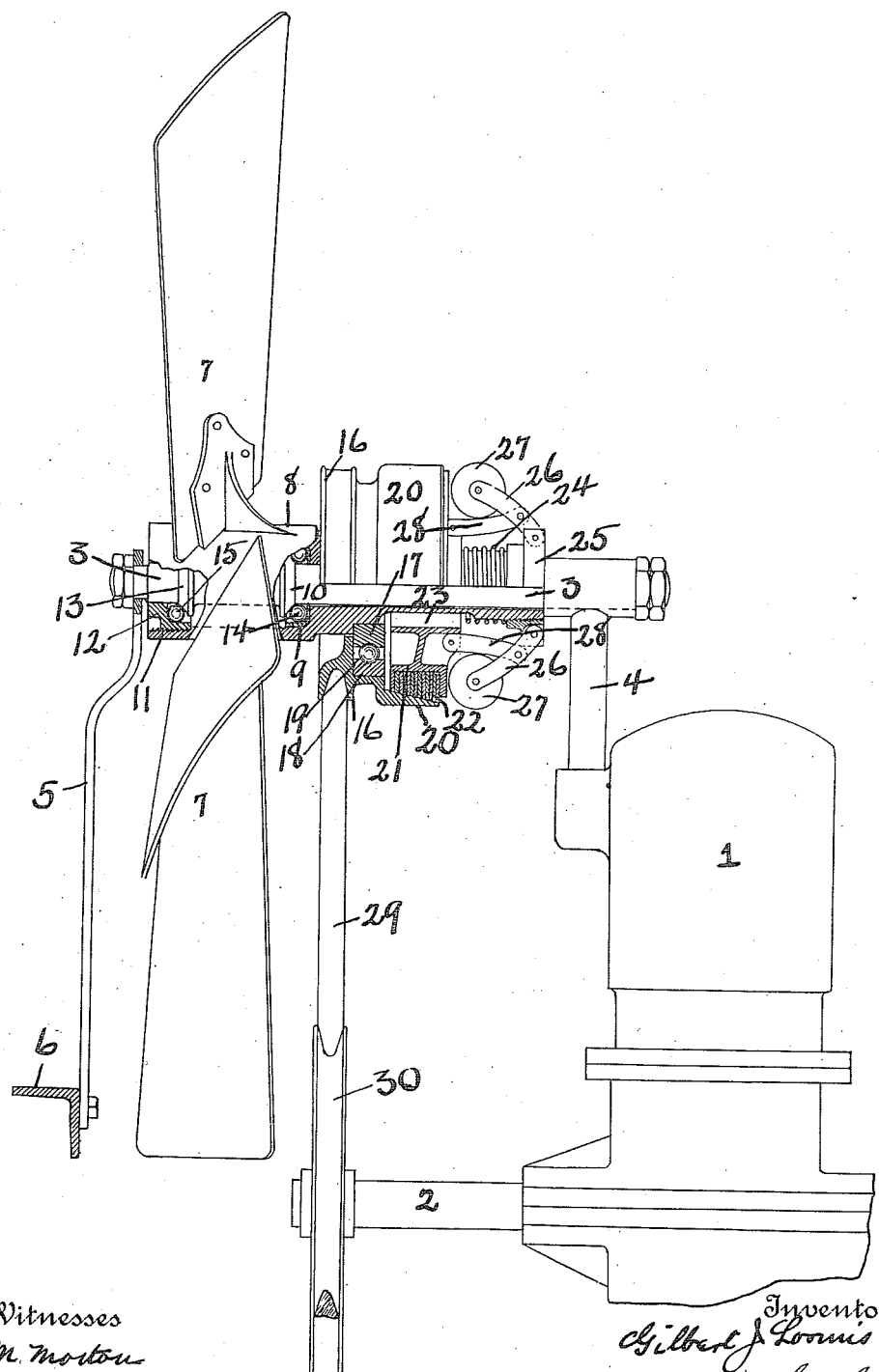

GILBERT J. LOOMIS, OF ERIE, PENNSYLVANIA, ASSIGNOR TO MODERN TOOL COMPANY, OF ERIE, PENNSYLVANIA, A CORPORATION OF PENNSYLVANIA.

DRIVING DEVICE FOR GAS-ENGINE FANS.

994,764. Specification of Letters Patent. Patented June 13, 1911.

Application filed February 11, 1907. Serial No. 356,689.

*To all whom it may concern:*

Be it known that I, GILBERT J. LOOMIS, a citizen of the United States, residing at Erie, in the county of Erie and State of Pennsylvania, have invented new and useful Improvements in Driving Devices for Gas-Engine Fans, of which the following is a specification.

This invention relates to driving devices for engine fans and consists in certain improvements in the construction thereof as will be hereinafter fully described and pointed out in the claims.

Fans have heretofore been used in connection with engines for insuring a circulation of air about the engine cylinders or radiator or condenser for the purpose of cooling the said devices. When the engine is running with a light load, but at high speed, the cylinder, radiator or condenser is not so highly heated as when the engine is running slower but with a greater load, while on the other hand, the fan is running at a higher velocity with a light load and higher speed than with a heavy load and slow speed. If the fan is speeded up to take care of the heavy load at low speed, this speed will be beyond the limit of safety for the fan when the engine is running at the higher speed incident to the lighter load.

The object of this invention is to vary, preferably automatically, the relative speeds of the fan and the engine so that the fan may be given a maximum velocity with the low speed of the engine, and this velocity is so varied as the engine is speeded up as to keep the velocity of the fan within the limits of safety.

An exemplification of the invention is illustrated in the accompanying drawing in connection with an air cooled gas engine, wherein:

1 marks the engine cylinder; 2 the crank shaft. A fan shaft 3 is supported by a post 4 extending upwardly from the engine. Any desired means of securing the shaft to the post may be used. The opposite end of the shaft is supported by the bar 5 extending from a plate 6. This plate 6 will, in the ordinary use of the invention, be some part of the frame of an automobile or other apparatus in which the engine may be used.

The fan 7 is mounted on a sleeve 8. This sleeve has the ball cup 9 formed in it which is opposed to the cone 10 on the shaft 3. The end of the sleeve is screw threaded at 11 and the ball cup 9 is screwed into this end and is opposed to the cone 13 on the shaft 3. Balls 14 and 15 are arranged between the cups 9 and 12, and cones 10 and 13, respectively, completing the ball bearing for the fan. A pulley 16 is mounted on a ball bearing comprising the grooved ring 17 secured to the sleeve 8, the grooved ring 18 secured to the pulley and the balls 19 arranged in these grooves.

The pulley 16 has extending from it the flange 20 which has an internally arranged cone friction surface, forming one member of a friction clutch. A cone frame 21 is provided with the fiber face 22 forming a cone friction surface opposite the friction surface in the flange 20. The frame 21 is slidingly mounted on the sleeve 8 but is secured against rotation by the feather or spline 23.

A spring 24 is tensioned between the frame 21 and the head 25. The head 25 is fixed on the sleeve 8. The arms 26 are pivotally mounted on the head 25 and carry the centrifugal weights 27. Links 28 extend from the frame 21 to the arms 26 and are so arranged that with an outward movement of the weights 27, the frame 21 is drawn away from the flange 20 so as to carry the cone surface on the frame 21 out of engagement with the cone surface on the flange 20. The spring 24 tends to move the frame 21 so that the cone surfaces are brought into engagement. A belt 29 extends from the pulley 16 to a pulley 30 fixed on the crank shaft.

The pulley 30 and the pulley 16 are so proportioned as to give the fan as high velocity as is desired with the engine running at a slow speed. As the speed of the engine increases, the weights 27 acting under the influence of centrifugal force, move outwardly and move the cone frame 21 so as to decrease the frictional engagement between the cone surfaces and with a sufficient speed of the engine to move these surfaces entirely out of engagement. The spring 24 opposes the centrifugal weights and tends to force the friction surfaces into engagement so that as the speed decreases, the spring which acts as a centripetal element of this controlling device forces the cone surfaces into engagement and thus the movement of the pulley is to a greater or less extent, communicated to the fan. At the slowest speed the strength of the spring is enough greater than the centrifugal force incident to the weights to give to the surfaces such an engagement as will communicate practically the entire movement of the pulley 16 to the fan.

What I claim as new is:

1. In a driving device for engine fans, the combination with an explosive engine adapted to variable loads and speeds; and a fan adapted to cool the engine of a driving connection between the engine and the fan comprising a frictional driving mechanism and automatic means for decreasing the frictional engagement of the mechanism as the speed of the engine increases.

2. In a driving device for engine fans, the combination with an explosive engine adapted to variable loads and speeds; and a fan adapted to cool the engine of a driving connection between the engine and the fan comprising a friction clutch and automatic means for decreasing frictional engagement of the clutch as the speed of the engine increases.

3. In a driving device for engine fans, the combination with an explosive engine adapted to variable loads and speeds; and a fan adapted to cool the engine of a driving connection between the engine and the fan comprising a friction clutch; and a centrifugally actuated automatic means for decreasing the frictional engagement of the mechanism as the speed of the engine increases.

4. In a driving device for engine fans, the combination with an explosive engine adapted to variable loads and speeds; and a fan adapted to cool the engine of a shaft 3 on which the fan is mounted; means for supporting the shaft at each end; and a driving connection between the fan and the engine mounted on said shaft and comprising a friction clutch and automatic means for decreasing the frictional engagement of the clutch as the speed of the engine increases.

5. In a driving device for engine fans, the combination with an explosive engine adapted to variable loads and speeds; and a fan adapted to cool the engine of a shaft 3; a sleeve mounted on said shaft and on which the fan is mounted; a pulley journaled on said sleeve and carrying one of the members of a friction clutch; the second member of the friction clutch slidingly mounted on the sleeve; a centrifugally actuated device for moving the clutch members out of engagement as the speed increases and for moving said members into engagement as the speed decreases; and means for driving the pulley from the engine.

6. In a driving device for engine fans, the combination with an explosive engine adapted to variable loads and speeds; and a fan adapted to cool the engine of a shaft 3; a sleeve 8 mounted on the shaft 3 and on which the fan is mounted; a pulley 16 journaled on the sleeve and having the flange 20 with the internally arranged cone surface; the opposing cone surface slidingly mounted on the sleeve and locked against rotation thereon; the head 25 fixed on the sleeve; the spring 24 tensioned between the head and said opposing cone; the arms 26 pivoted on the head; the weights 27 carried by the arms; and the links 28 connecting the arms with said opposing cone, the links and arms being arranged to move the clutch members out of engagement as the weight moves outwardly under the influence of centrifugal force.

7. In a driving device for engine fans, the combination with an explosive engine adapted to variable loads and speeds; and a fan adapted to cool the engine of a driving connection between the engine and the fan comprising a shaft on which the fan is mounted; a support for one end of said shaft secured to the engine; a friction driving mechanism mounted on the shaft; and automatic means for increasing the frictional engagement of the mechanism as the speed of the engine decreases.

8. In a driving device for engine fans, the combination with an explosive engine adapted to variable loads and speeds; and a fan adapted to cool the engine of a shaft on which the fan is supported; supports for both ends of said shaft; a frictional driving mechanism mounted on the shaft; means for communicating the movement of the engine to said mechanism; and means for automatically decreasing the frictional engagement of said mechanism as the speed of the engine increases.

9. In a driving device for engine fans, the combination with an explosive engine adapted to variable loads and speeds; and a fan adapted to cool the engine of a driving connection between the engine and the fan comprising a clutch and automatic means for throwing the clutch into and out of engagement as the speed of the engine decreases and increases respectively.

10. In a driving device for engine fans, the combination with an explosive engine adapted to variable loads and speeds; and a fan adapted to cool the engine of a driving connection between the engine and the fan comprising a driving device having a driving and a driven member; and means for varying the driving relation between said members as the speed of the engine varies to increase the driving effect of the driving device as the speed of the engine decreases, and to decrease the driving effect of the driving device when the speed of the engine increases.

In testimony whereof I have hereunto set my hand in the presence of two subscribing witnesses.

GILBERT J. LOOMIS.

Witnesses:
C. D. HIGBY,
B. F. PARKER.